United States Patent [19]
Hashimoto et al.

[11] Patent Number: 6,034,787
[45] Date of Patent: Mar. 7, 2000

[54] IMAGE PROCESSING APPARATUS HAVING A HIGH GRADATION MODE AND A HIGH RESOLUTION MODE OF OPERATION

[75] Inventors: Tomohiro Hashimoto, Kawasaki; Yasuo Ito, Yokosuka, both of Japan

[73] Assignee: Canon Kabushiki Kaisha, Tokyo, Japan

[21] Appl. No.: 07/883,173

[22] Filed: May 15, 1992

[30] Foreign Application Priority Data

May 20, 1991 [JP] Japan .................................. 3-114594

[51] Int. Cl.[7] .................................................. G06F 15/00
[52] U.S. Cl. ........................................... 358/1.9; 358/1.13
[58] Field of Search .................................... 395/109, 112; 358/455, 456, 457, 458, 534, 535, 536, 298, 296, 1.1, 1.2, 1.8, 1.15; 346/157; 372/38, 26; 382/270

[56] References Cited

U.S. PATENT DOCUMENTS

| | | | |
|---|---|---|---|
| 4,370,667 | 1/1983 | Ohara et al. | 346/108 |
| 4,384,297 | 5/1983 | Ohara et al. | 346/108 |
| 4,682,190 | 7/1987 | Ikeda | 346/154 |
| 4,750,010 | 6/1988 | Ayers et al. | 346/107 R |
| 4,800,422 | 1/1989 | Sanwo et al. | 357/82 |
| 4,821,334 | 4/1989 | Ogino et al. | 358/457 |
| 4,891,714 | 1/1990 | Klees | 358/456 |
| 4,924,509 | 5/1990 | Yokomizo | 358/456 |
| 4,926,248 | 5/1990 | Kobayashi et al. | 358/75 |
| 4,951,159 | 8/1990 | Van Beek | 358/455 |
| 4,998,122 | 3/1991 | Kanno et al. | 358/462 |
| 5,029,227 | 7/1991 | Kawamura | 358/455 |
| 5,081,631 | 1/1992 | Dhurjaty | 372/38 |
| 5,101,438 | 3/1992 | Kanda et al. | 358/462 |
| 5,251,023 | 10/1993 | Arimoto et al. | 358/529 |
| 5,251,267 | 10/1993 | Kawamura | 358/455 |
| 5,301,039 | 4/1994 | Tanioka | 358/457 |

FOREIGN PATENT DOCUMENTS 216536   4/1987   European Pat. Off. ......... H04N 1/40

*Primary Examiner*—Dov Popvici
*Attorney, Agent, or Firm*—Fitzpatrick, Cella, Harper & Scinto

[57] ABSTRACT

An image processing apparatus includes an input device which inputs a digital input signal expressing a gradation, and a timing signal generator generates a predetermined timing signal. A delay device delays the timing signal in accordance with the gradation expressed by the digital input signal, and a pulse width modulation signal generator generates a pulse width generation signal having a pulse width in accordance with the gradation of the digital input signal, based upon the signal delayed by the delay device. An intermediate gradation is expressed by controlling on the ON/OFF time of a laser beam without the need for offset and gain adjustments which are characteristics of an analog circuit. In a first mode, one dot is formed in correspondence with one pixel of the digital input signal, and in a second mode one dot is formed in correspondence with a plurality of pixels of the digital input signal.

19 Claims, 13 Drawing Sheets

ND A HIGH
IMAGE PROCESSING APPARATUS HAVING A HIGH GRADATION MODE AND A HIGH RESOLUTION MODE OF OPERATION

BACKGROUND OF THE INVENTION

1. Field of the Invention

The present invention relates to an image processing apparatus, and more specifically, to an image processing apparatus capable of an excellent reproduction of an intermediate gradation.

2. Related Background Art

Conventionally, since an image formation apparatus such as a laser beam printer or the like has difficulty expressing a gradating image, a method of reproducing a pseudo-intermediate-gradation referred to as an area gradation has been used.

This intermediate gradation reproduction method includes:

(1) a method of reproducing an intermediate gradation referred to as a so-called pulse width modulation (PWM) system, wherein, typically, digital input image data is subjected to a D/A conversion, and the thus D/A converted analog signal is compared with a reference triangular wave signal to thereby perform an ON/OFF control of a laser beam, as disclosed in U.S. Pat. No. 4,800,422; and (2) a method of effecting a binary coding processing referred to as a dither method, a density pattern technique or the like, wherein when a printer has a sufficiently high record resolution by itself, digital input image data is subjected to a binary coding processing with a clock having a frequency higher than that of a pixel clock of the input image data to thereby reproduce an intermediate gradation, other methods may also be used.

Nevertheless, the above pulse width modulation method is disadvantageous in that an offset of the reference triangular signal and a gain of a D/A converter must be adjusted, which adjustment is time-consuming.

The above dither method and density pattern technique are also disadvantageous in that when the number of gradations is to be increased, the quality of an image is greatly degraded unless the printer has an increased record resolution. Consequently, although a clock frequency used for the binary coding processing must be increased with an increased circuit cost, the number of gradations cannot be increased too much because the operating speed of the devices is limited. In addition, the number of lines capable of being produced (resolution) must be reduced in order to realize a high gradation while restricting a circuit cost and operating speed.

Further, U.S. Pat. No. 4,926,248 discloses a method of expressing a gradating image by generating a PWM signal through digital processing. In this method, however, a problem arises in that cost is increased by the use of an expensive circuit element because a high frequency clock is required to generate a triangular wave which changes stepwise, and in addition a countermeasure for unnecessary radiation is needed. Furthermore, although U.S. Pat. No. 4,370,667 discloses a technology relating to the generation of a PWM signal, this technology has the same problem as that of U.S. Pat. No. 4,926,248.

SUMMARY OF THE INVENTION

An object of the present invention is to solve the aforesaid problems.

Another object of the present invention is to provide an image processing apparatus capable of outputting an image of high quality without the need for a time-consuming adjustment.

A further object of the present invention is to provide an image processing apparatus capable of switching a mode in which emphasis is placed on a high gradation and a mode in which emphasis is placed on a high resolution.

According to the present invention, there is provided a switch means for switching a mode in which one dot is formed in correspondence with one pixel of a digital input image signal and a mode in which one dot is formed in correspondence with a plurality of pixels of the digital input image signal, a dot division means for dividing one dot into a plurality of blocks, and a means for generating one dot start/end timing signals based upon a division timing signal from the dot division means and/or the digital input image signal, whereby an intermediate gradation can be expressed by controlling a pixel formation time without the need for offset and gain adjustments which are characteristic of an analog circuit. Further, a gradation can be changed by switching the mode in which one dot is formed in correspondence with one pixel of the digital input image signal and the mode in which one dot is formed in correspondence with a plurality of pixels of the digital input image signal.

Other objects, advantages and effects of the present invention will be more apparent from the following detailed description, claims and attached drawings.

DETAILED DESCRIPTION OF THE PREFERRED EMBODIMENTS

Embodiments of the present invention will be described below in detail with reference to the drawings.

<Description of a Schematic Arrangement of the Image Formation Apparatus>

Figure 1:
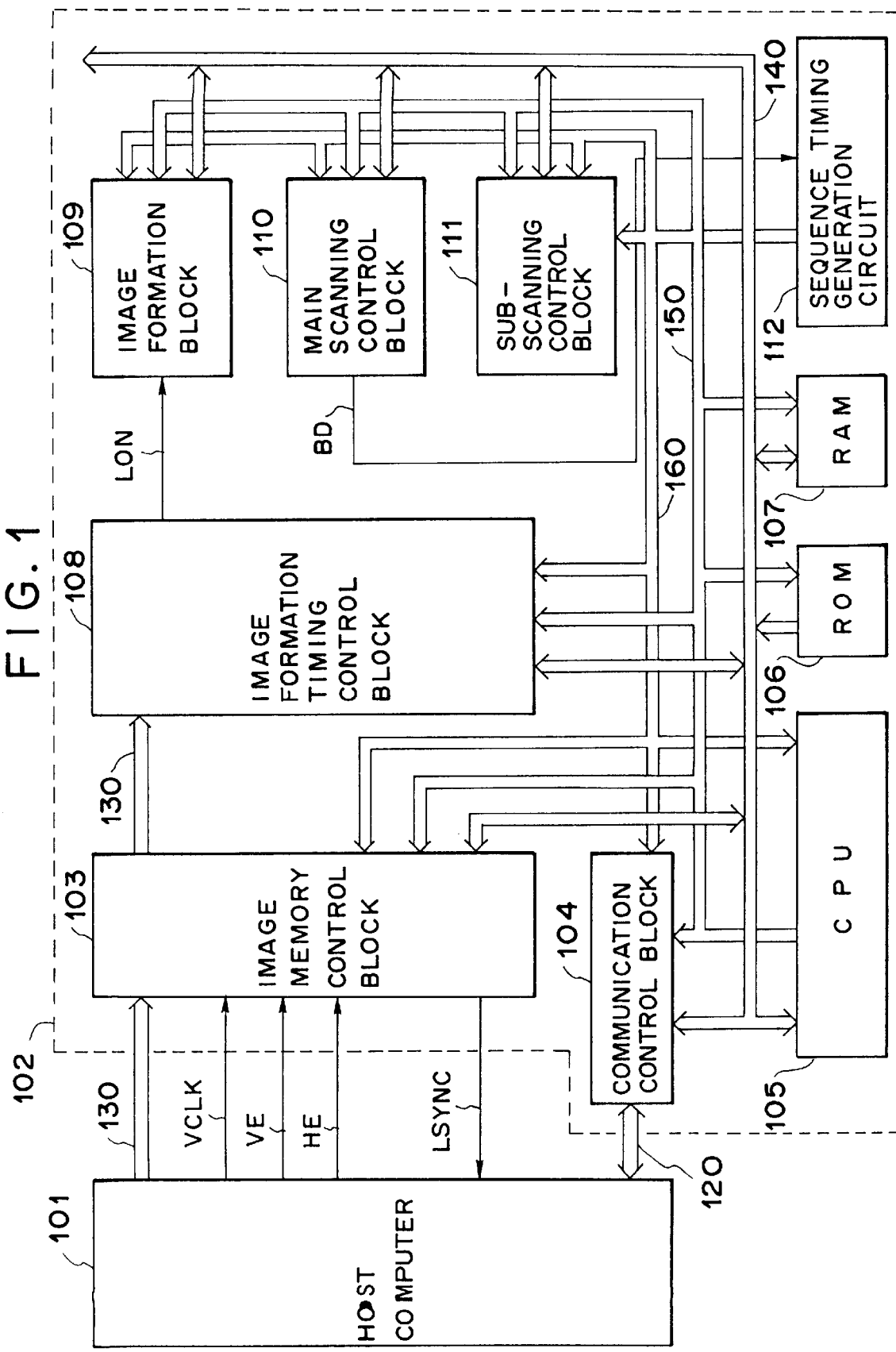
FIG. 1 is a diagram showing the schematic arrangement of an image processing apparatus of an embodiment.

FIG. 1 is a diagram showing the schematic arrangement of an embodiment of the present invention.

In FIG. 1, 101 designates a host computer for controlling an image formation apparatus 102. The host computer 101 stores digital image data read from, for example, an image scanner (not shown) in a memory (not shown) accommodated therein and transmits the image data to the image formation apparatus 102 after it has been subjected to image processings such as a window processing, movement processing and the like.

Figure 2:
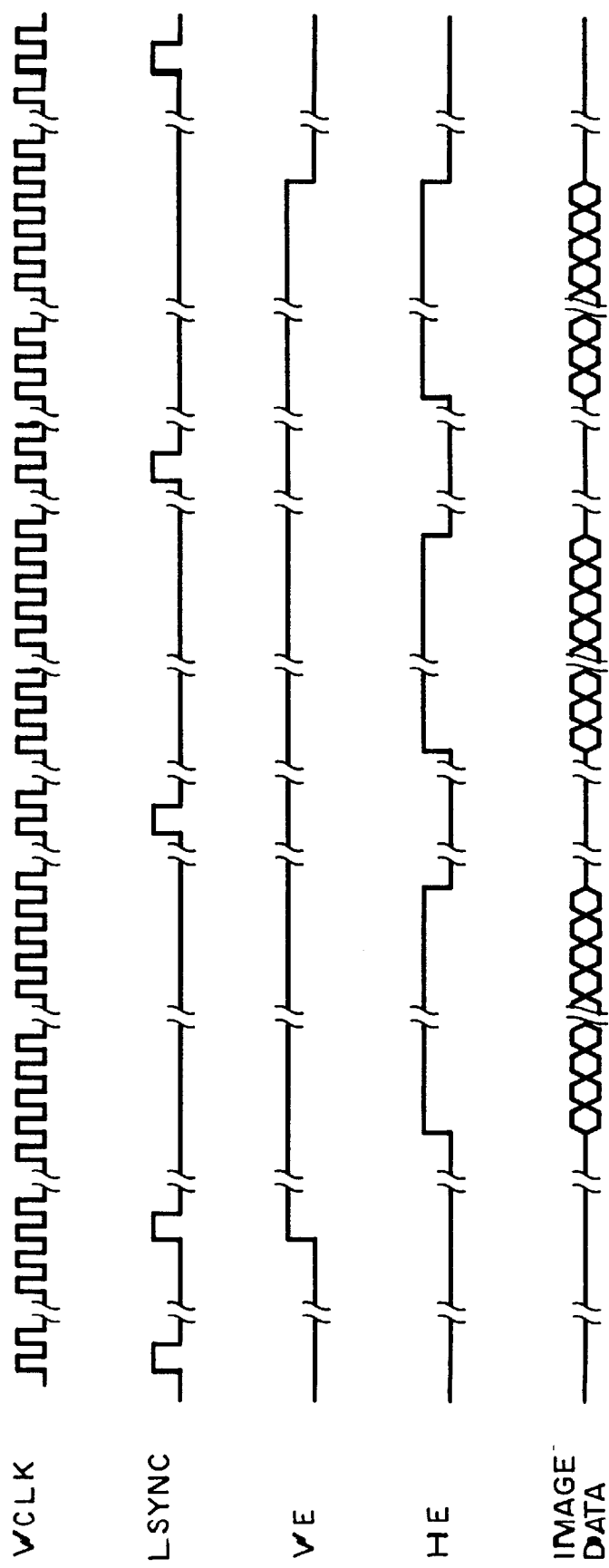
FIG. 2 is a timing chart showing an example of timings at which image data is transmitted between a host computer and an image formation apparatus.

Designated at 103 is an image memory control block for storing the digital image data transmitted from the host computer 101. This image memory control block is arranged as, for example, a double line buffer and outputs the digital image data transmitted from the host computer 101 to the image formation apparatus 102 in synchronism with an image formation timing. FIG. 2 is a timing chart showing an example of timings at which an image is transmitted between the host computer 101 and the image formation apparatus 102.

In FIGS. 1 and 2, VCLK designates an image transmission clock for transmitting the image data from the host computer 101 to the image formation apparatus 102; LSYNC designates a sub-scanning synchronization signal of the image formation apparatus 102; VE designates a vertical image effective signal indicating the effective area of an image contained in a page; HE designates a horizontal image effective signal indicating the image effective area for a single main scan, 120 designates a communication line through which a command is transmitted from the host computer 101 to the image formation apparatus 102 and a status signal from the image formation apparatus 102 to the host computer 101; 104 designates a communication control block for communicating with the host computer 101 through the communication line 120; and 130 designates an image data transmission line.

In FIG. 1, 105 designates a CPU for executing a series of control sequences of the image formation apparatus 102; 106 designates a ROM for storing a program for executing the above control sequence; and 107 designates a RAM for storing information necessary for executing the above control sequences.

Also in FIG. 1, 108 designates an image formation timing control block to be described in later; 109 designates an image formation block for controlling a laser beam source, a laser driver, a photoconductive drum, transfer drum and the like used in an electrophotographic process; 110 designates a main scanning control block for controlling a polygon scanner for a laser scanning and for generating a BD (beam detecting) signal indicating the start of each main scanning; 111 designates a sub-scanning control block for controlling the feed of a recording paper and the rotation of the photoconductive drum, the transfer drum and the like; 112 designates a sequence timing signal generation circuit for generating a timing signal for a series of the control sequence of the image formation apparatus 102; 140 designates a data bus; 150 designates an address bus; and 160 designates a timing signal line.

Figure 3:
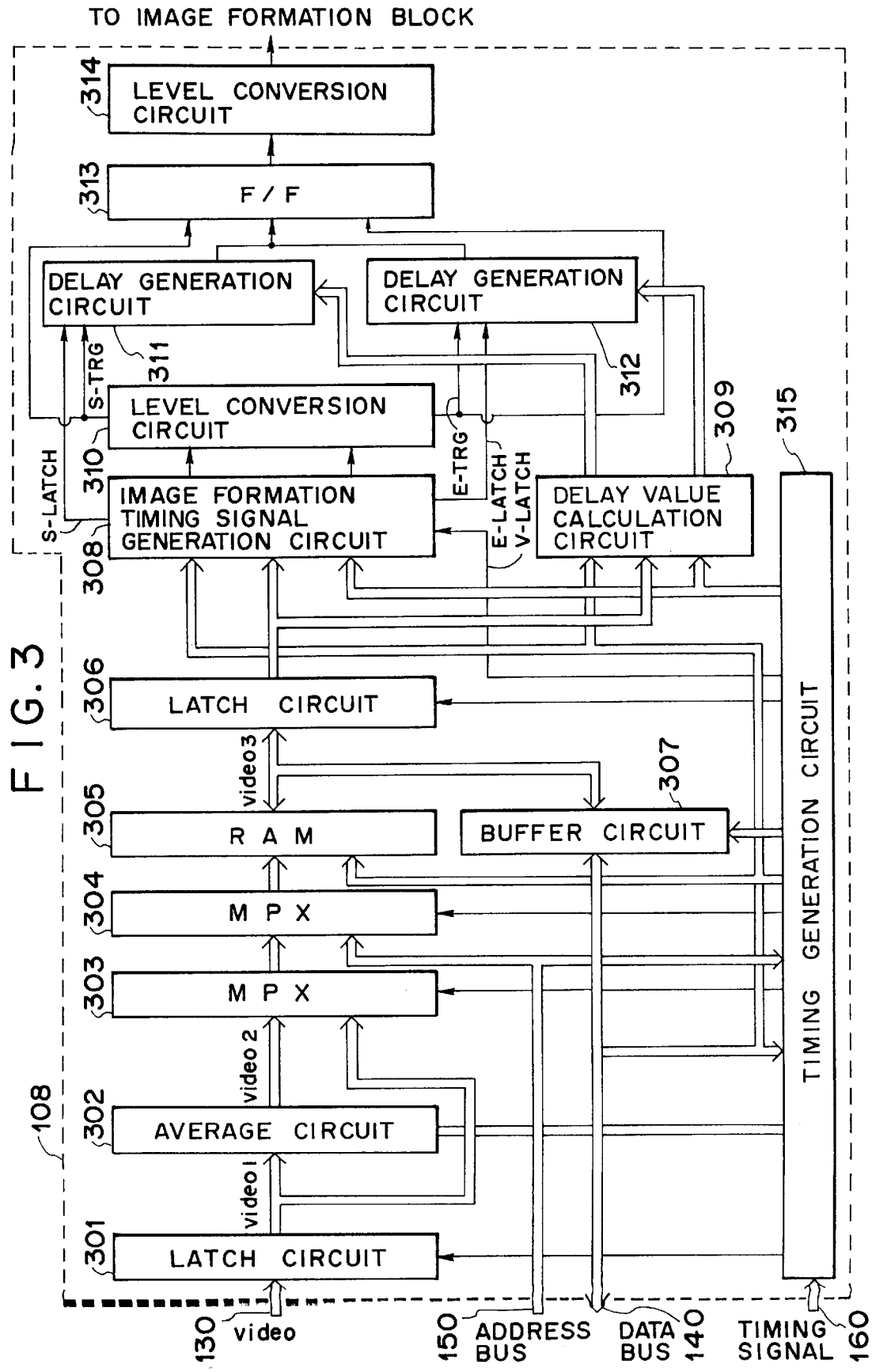
FIG. 3 is a diagram showing the schematic arrangement of a first embodiment of an image formation timing control block.

FIG. 3 shows a diagram of the arrangement of the image formation timing control block 108 of the image formation apparatus 102.

Figure 4:
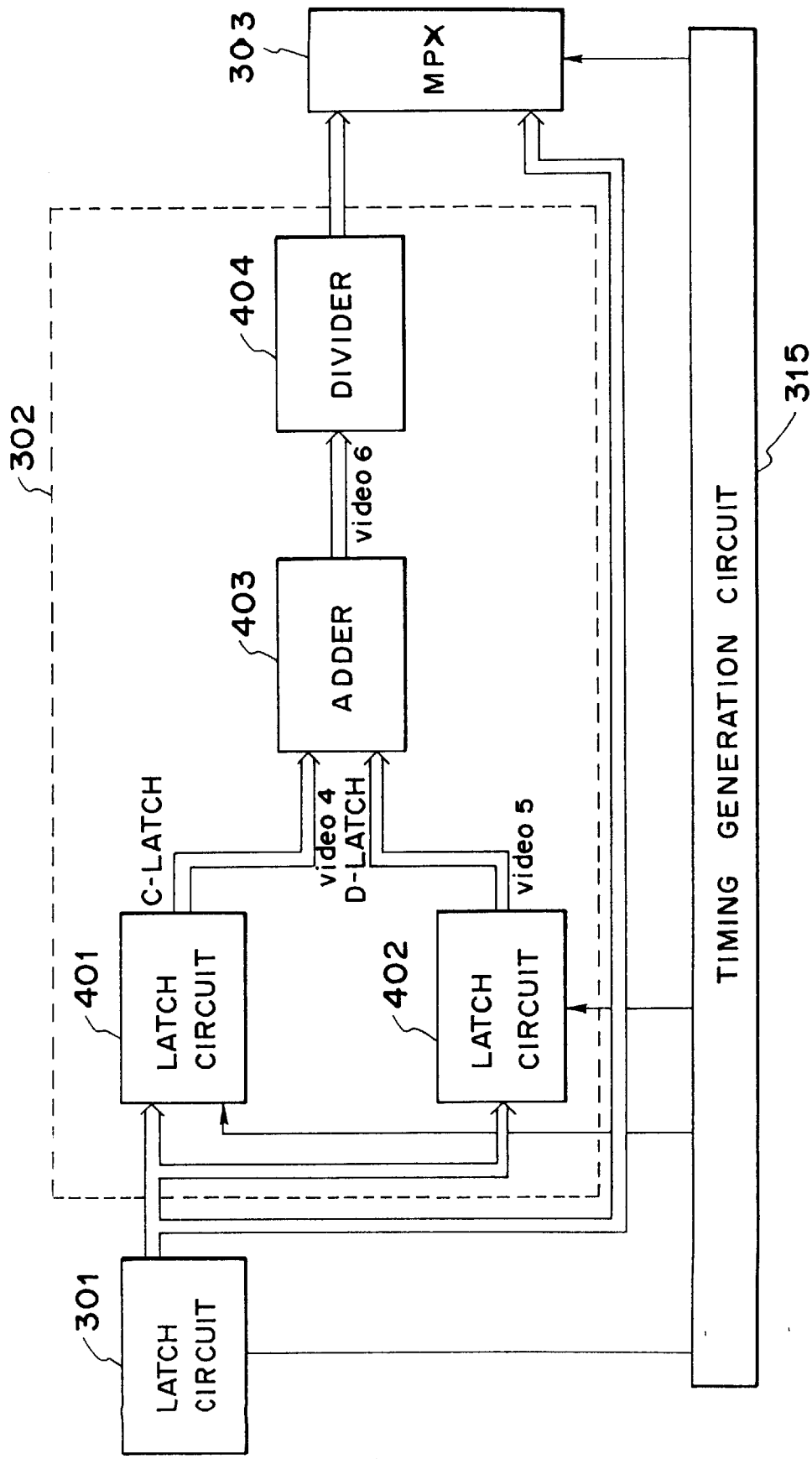
FIG. 4 is a diagram showing an example of the arrangement of the average circuit shown in FIG. 3.

In FIG. 3, 301 designates a latch circuit for latching digital image data (Video 0) transmitted from the image memory control block 103 (an output from the latch circuit 301 is designated as Video 1); 302 designates an average circuit for determining an average of the gradations of a plurality of pixels of a digital input image signal when a mode is selected in which a plurality of the pixels of the digital input image signal correspond to one dot, and an example of the arrangement of this average circuit is shown in FIG. 4 (an output from the average circuit is designated as Video 2); 303 designates a multiplexer (MPX) for switching the selection of the Video 1 and the selection of the Video 2 depending upon whether a mode for forming one dot in correspondence with a pixel of the digital input image signal is selected or a mode for forming one dot in correspondence with a plurality of the pixels of the digital input image signal is selected; 305 designates a RAM for storing a table for effecting a γ conversion so that the input image data is matched with the output characteristics of a printer; 304 designates a multiplexer (MPX) for switching address information supplied to the RAM 305 depending upon whether a case in which the CPU 105 sets the γ conversion data to the γ conversion table of the RAM 305 prior to the formation of an image is selected or a case in which the γ conversion data is selected in accordance with a value of the Video 1 (or the Video 2) signal when the image is formed; 307 designates a buffer circuit for electrically connecting or disconnecting the data bus 140 of the CPU 105 to and from the I/O bus of the RAM 305; and 306 designates a latch circuit for latching data output from the γ conversion RAM 305 (an output from the latch circuit 306 is designated as Video 3).

Also in FIG. 3, 308 designates an image formation timing signal generation circuit for dividing one dot formation interval formed by one dot into a plurality of blocks in accordance with a density based upon the value of the above Video 3 on receipt of the Video 3 and for generating a timing signal for forming an image; 309 designates a delay value calculation circuit for calculating a time delay value in correspondence with the Video 3 from a pixel division timing signal produced from the above image formation timing signal generation circuit 308; and 310 designates a level conversion circuit for converting a TTL level electric signal output from the above image formation timing signal generation circuit 308 to an ECL level electric signal.

Designated at 311 and 312 are delay generation circuits each for receiving a start trigger signal S-TRG and an end trigger signal E-TRG output from the level conversion circuit 310 and for generating pulse signals S-CLK and E-CLK after a predetermined time set by the delay value calculation circuit 309 has elapsed. A digital programmable generator (e.g., AD9500) can preferably be used as these delay generation circuits.

Designated at 313 is a flip-flop for generating a signal having a predetermined period of time on receipt of the above signals S-TRG, E-TRG, S-CLK, and E-CLK (the signals S-CLK and E-CLK are wired OR connected) and designated at 314 is a level conversion circuit for converting an ECL level output from the flip-flop 313 to a TTL level signal.

Also, designated at 315 is a timing generation circuit for generating an operation timing signal for the image formation timing control block 108.

The operation of the image formation timing control block 108 will be described below with reference to FIGS. 5 to 10, with respect to a case in which one dot is formed in correspondence with one pixel of the digital input image signal and a case in which one dot is formed in correspondence with a plurality of the pixels of the digital input image signal.

First, the operation of the image formation timing control block 108 will be described when one dot is formed in correspondence with one pixel of the digital input image signal, with reference to FIGS. 5 to 7.

Figure 5:
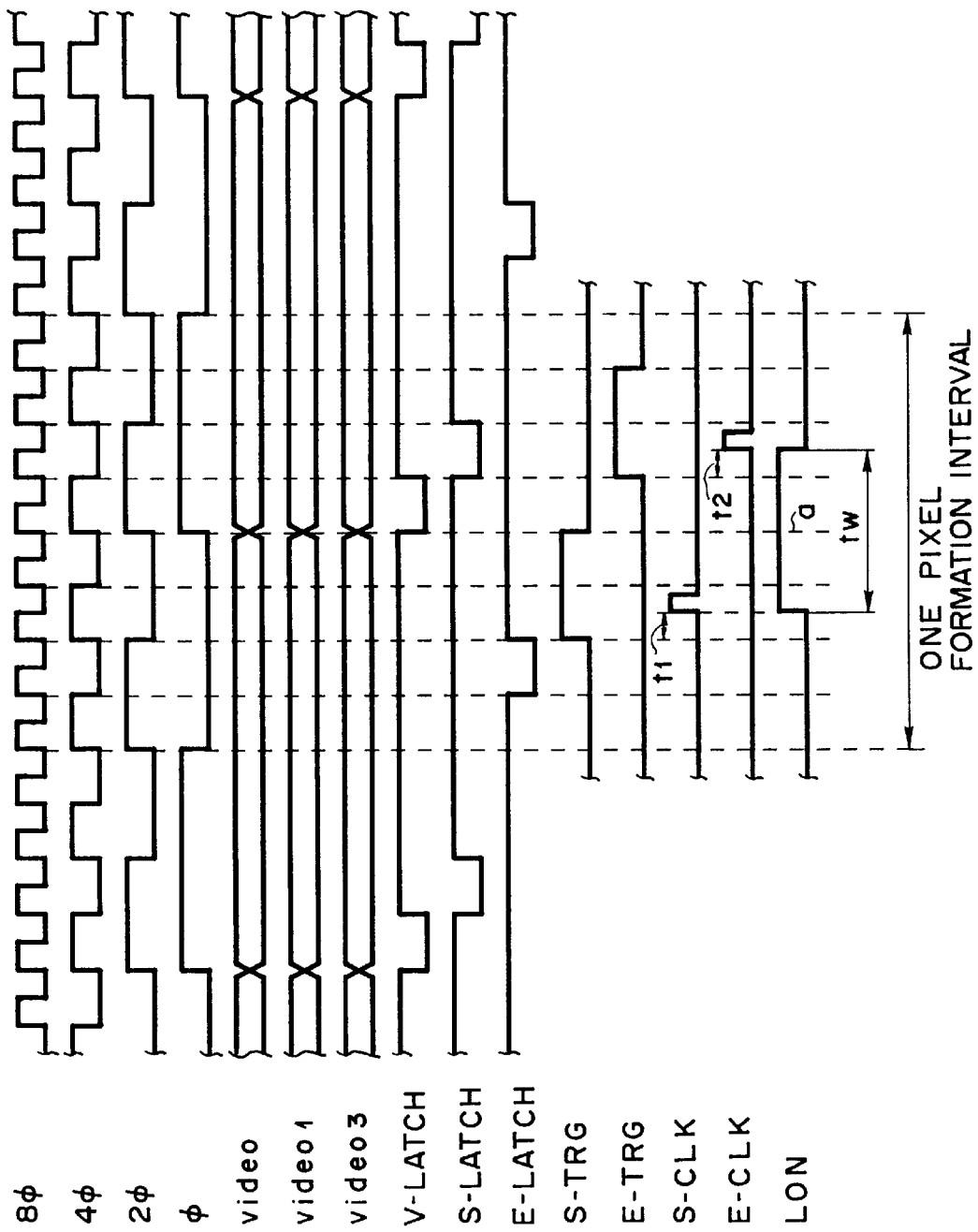
FIG. 5 is a diagram showing an example of the operation of the image formation timing control block shown in FIG. 3 in a mode in which a single digital input image signal corresponds to one dot.
Figure 6:
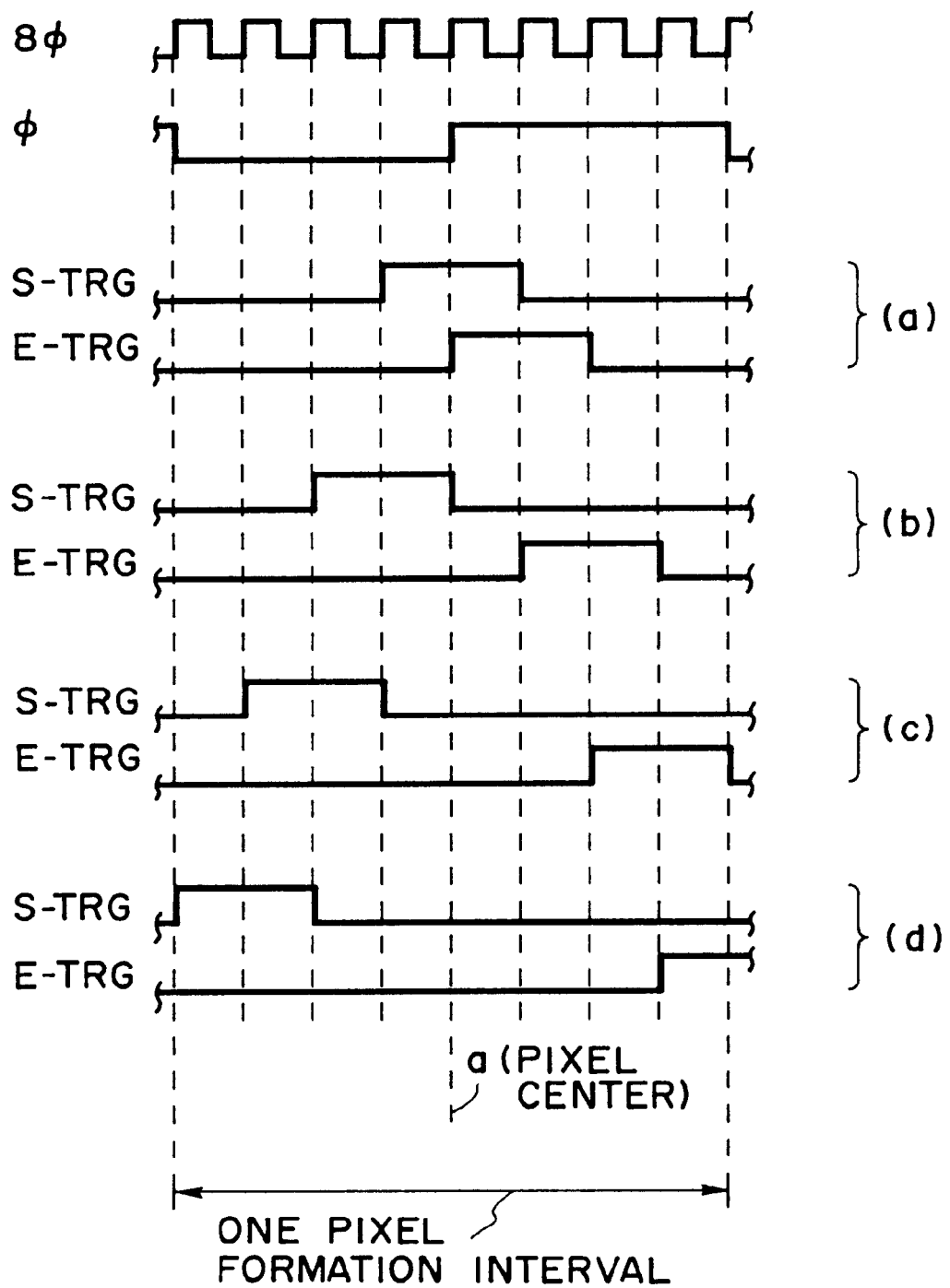
FIG. 6 is a diagram showing an example of timings of an image formation timing signal in correspondence with an input data value in a mode in which a single digital input image signal corresponds to one dot.
Figure 7:
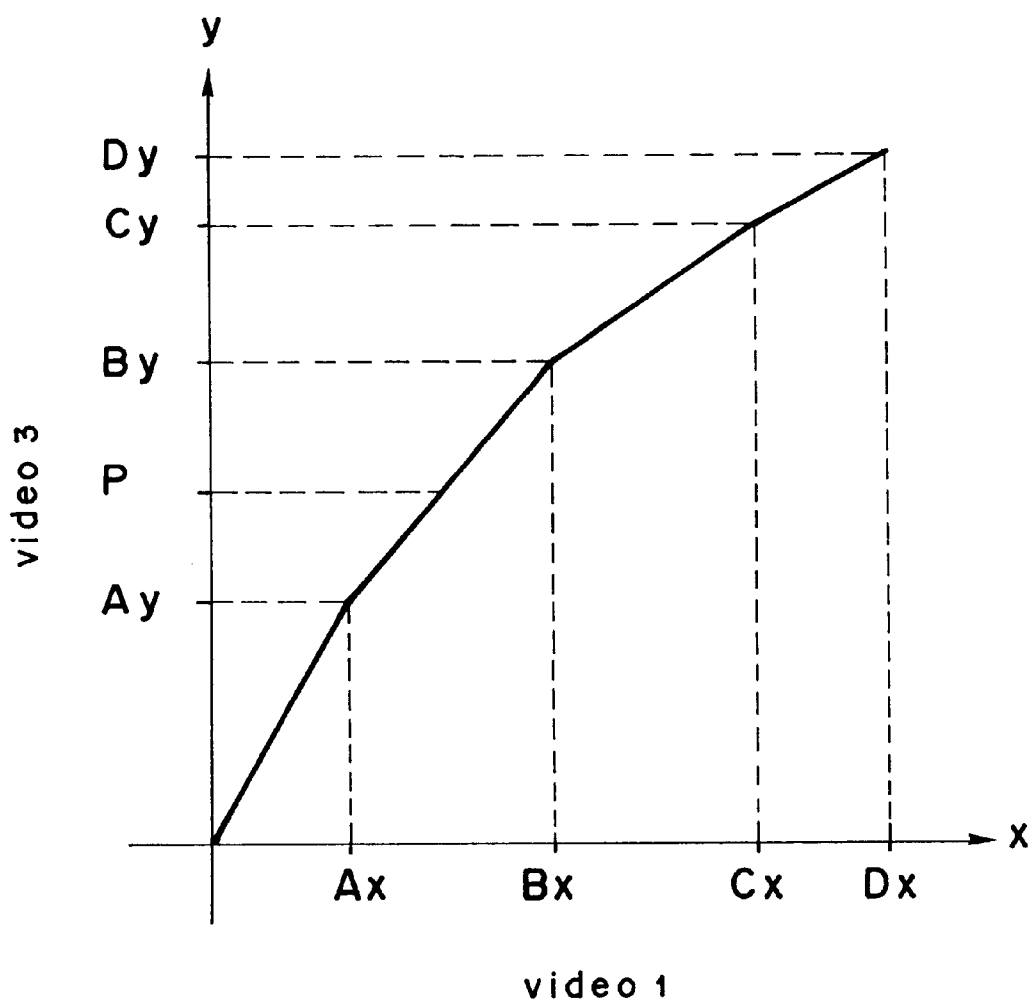
FIG. 7 is a diagram showing an example of a γ conversion in a mode in which a single digital input image signal corresponds to one dot.

FIG. 5 is an operation timing chart showing an example of the operation of the image formation timing control block 108 when one dot is formed in correspondence with one pixel of the digital input image signal, FIG. 6 is a timing chart showing an example of output timings of the S-TRG and E-TRG signals obtained by level converting a signal output from the image formation timing signal generation circuit 308 in correspondence with the digital input image, and FIG. 7 is a diagram showing an example of the γ conversion.

In FIG. 7, the abscissa x shows digital input image data (Video 1 shown in FIGS. 3 and 5) and the ordinate y shows digital image data having been γ converted (Video 3 shown in FIGS. 3 and 5), wherein the Video 3 is γ converted by the RAM 305 shown in FIG. 3 so that it has a value 0–Ay, Ay–By, By–Cy, or Cy–Dy, respectively, as the Video 1 has a value 0–Ax, Ax–Bx, Bx–Cx, or Cx–Dx. Note, as described above, the CPU 105 can set the content of the RAM 305 and thus the γ conversion table can be easily changed.

In FIG. 6, φ designates a clock signal for forming one dot and 8φ designates a clock signal for dividing one dot into equally divided eight blocks about a pixel center [a] in the present embodiment and has a frequency obtained by multiplying the clock signal φ by 8. Further, the items (a), (b), (c) and (d) show an example of output timings of the S-TRG and E-TRG signals after the signal output from the image formation timing signal generation circuit 308 has been level converted, wherein:

(a) where the Video signal 3 is 0–Ay;

(b) where the Video signal 3 is Ay–By;

(c) where the Video signal 3 is By–Cy; and (d) where the Video signal 3 is Cy–Dy.

Next, an image forming operation will be described referring mainly to FIG. 5.

A digital image data Video supplied from the image memory control block 103 is latched by the latch circuit 301 at a leading edge of the clock signal φ and the Video 1 is provide as an address to be input to the RAM 305. At this time, the multiplexer 303 selects an output from the latch circuit 301 and the multiplexer 304 selects an output from the multiplexer 303. On receiving the Video 1, the RAM 305 outputs γ converted data which is latched by the latch circuit 306 at a leading edge of the clock signal φ (Video 3). The image formation timing signal generation circuit 308 fetches the Video 3 at a leading edge of a V-LATCH and generates the S-TRG and E-TRG signals at any one of the timings of (a), (b), (c) and (d) shown in FIG. 6 in accordance with a value of the Video 3 [FIG. 5 shows an example of (b)]. Further, the delay value calculation circuit 309 fetches the Video 3 at a leading edge of the V-LATCH and calculates respective time delay values S-DATA, E-DATA delayed from the S-TRG and E-TRG signals generated by the image formation timing signal generation circuit 308 (in the example of FIG. 5, these values are t1 and t2), and values corresponding to t1 and t2, i.e., S-DATA and E-DATA are provided to the delay generation circuits 311 and 312 in response to the S-LATCH and E-LATCH signals output from the image formation timing generation circuit 308. Note that the S-LATCH, E-LATCH, S-DATA and E-DATA are TTL level signals and the S-TRG and E-TRG signals are ECL level signals.

The delay calculation circuit 309 is composed, for example, of a RAM and a time delay value is obtained by a table conversion processing in the same way as that of the RAM 305. The time delay value, however, may be set by the CPU 105 or may be set in such a manner that the above table conversion processing function is provided with the RAM 305, a value corresponding to any one of the t1 and t2 is output from the RAM 305 by making use of the fact that t1+t2=t (a time of a divided single block) and supplied to the delay value calculation circuit 309 to thereby calculate the other of these values.

Thereafter, the delay generation circuits 311 and 312 trigger the S-TRG and E-TRG signals, respectively and generate pulse signals S-CLK and E-CLK at the time at which they count the times t1 and t2.

On receiving the respective S-TRG, E-TRG, S-CLK and E-CLK signals, the flip-flop 313 generates a signal LON having a period of time tw in FIG. 5 (a density signal corresponding to the point P in FIG. 7). The LON signal is subjected to an ECL to TTL level convertion (LON signal) and then drives a laser driver (not shown) to thereby control the density of an image formed while the laser driver is driven.

Next, the operation of the image formation timing control block 108 will be described when one dot is formed in correspondence with a plurality of pixels of a digital input image signal.

Figure 8:
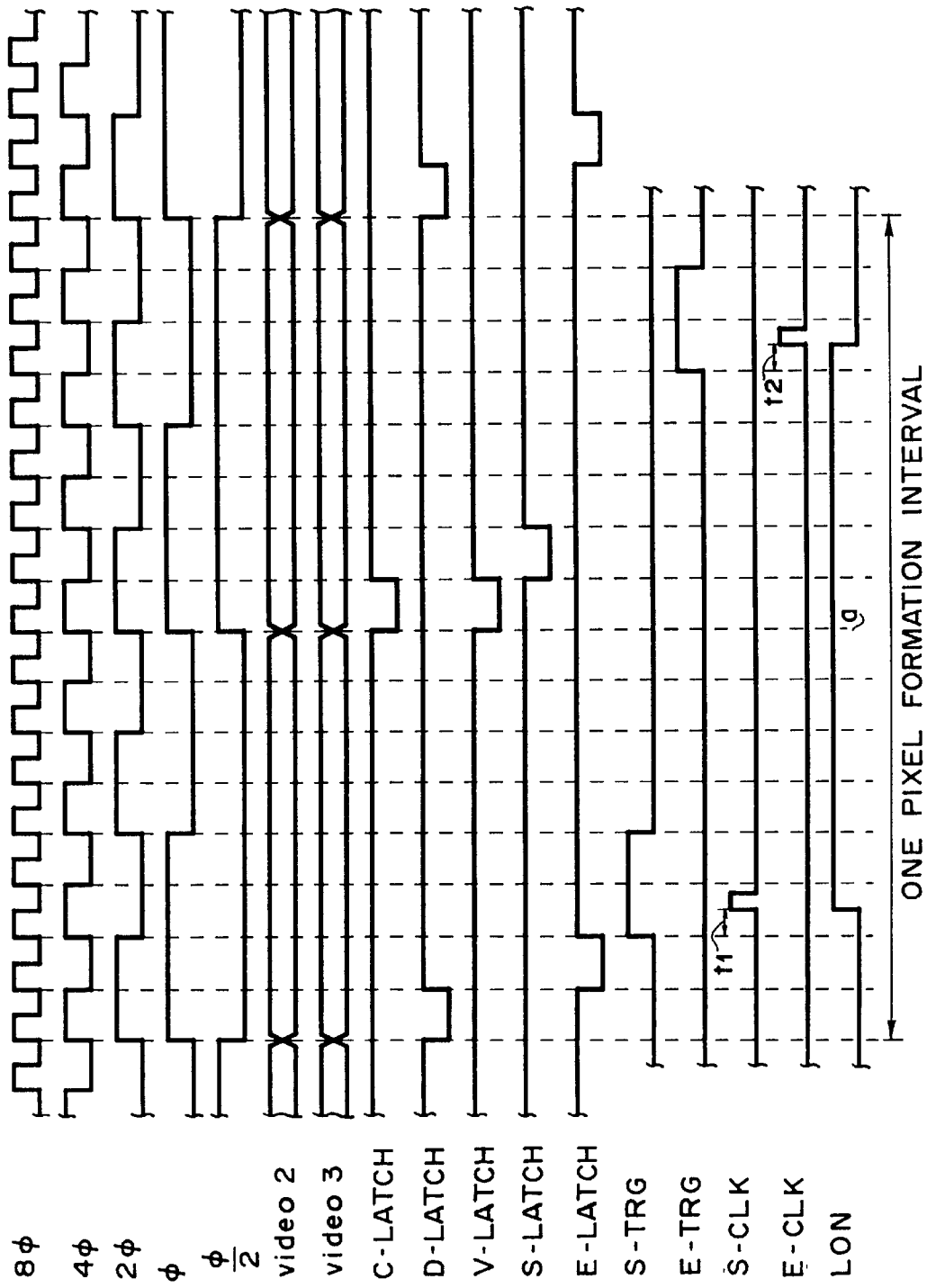
FIG. 8 is a diagram showing an example of the operation of the image formation timing control block shown in FIG. 3 in a mode in which a plurality of digital input image signals correspond to one dot.
Figure 9:
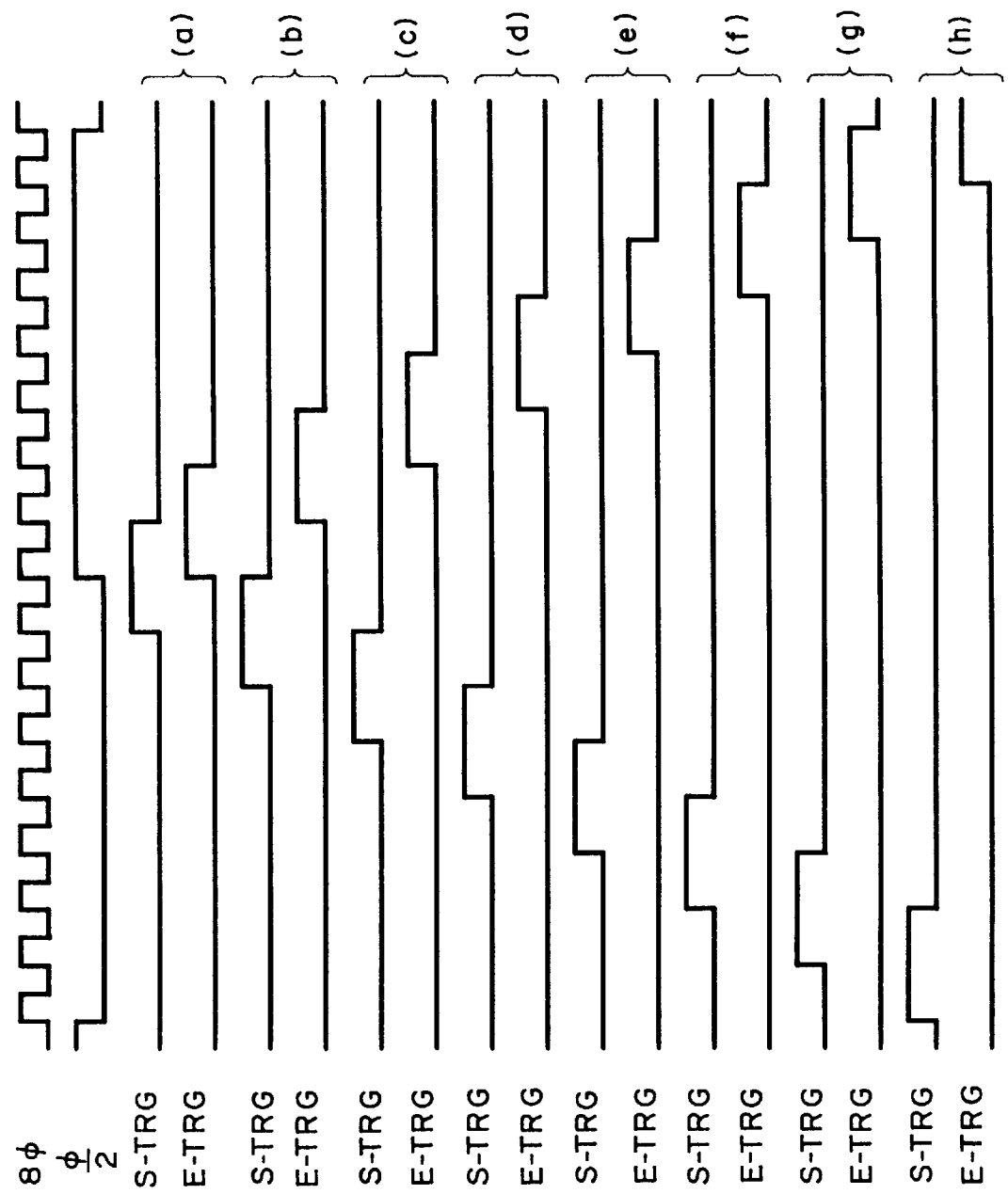
FIG. 9 is a diagram showing an example of timings of an image formation timing signal in correspondence with an input data value in a mode in which a plurality of digital input image signals correspond to one dot.
Figure 10:
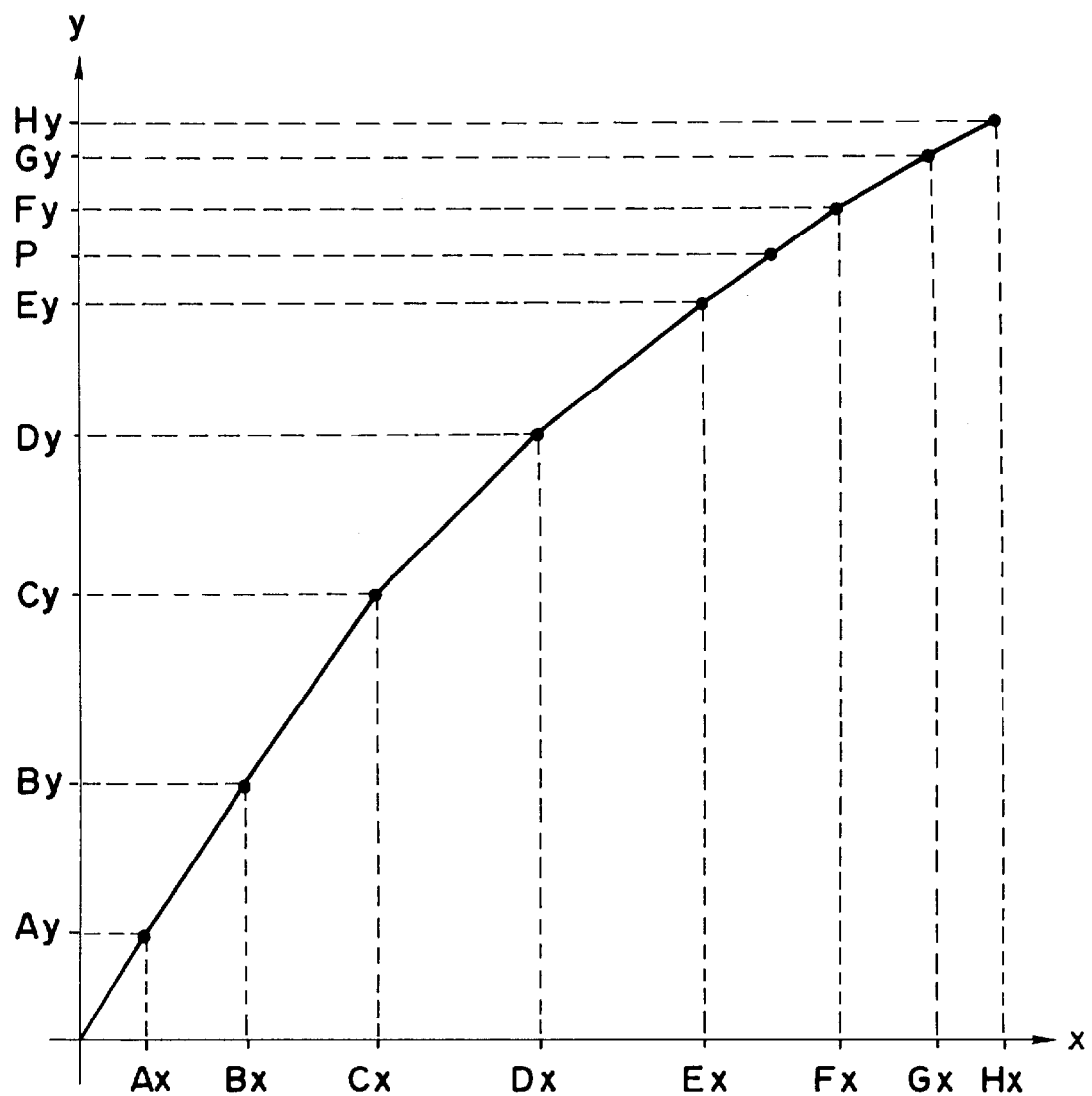
FIG. 10 is a diagram showing an example of a γ conversion in a mode in which a plurality of digital input image signals correspond to one dot.

FIG. 8 is an example of an operation timing chart showing an example of the image formation timing control block 108 when one dot is formed in correspondence with a plurality of pixels of the digital input image signal, FIG. 9 is a chart showing an example of output timings of the S-TRG and E-TRG signals obtained by level converting the signals, which are output from the image formation timing generation circuit 308 in correspondence with the digital input image signal, by the level conversion circuit 310, and FIG. 10 is a diagram showing an example of a γ conversion.

In FIG. 10, the abscissa x shows input image data (the Video 2 shown in FIGS. 3 and 8) and the ordinate y shows digital input data having been subjected to a γ conversion (the Video 3 shown in FIG. 3 and 8), and the γ conversion is carried out by the RAM 305 shown in FIG. 3 so that the Video 3 has a value 0–ay, ay–by, by–cy, cy–dy, dy–ey, ey–fy, fy–gy, or gy–hy as the Video 2 has a value 0–ax, ax–bx, bx–cx, cx–dx, dx–ex, ex–fx, fx–gx, or gx–hx.

In FIG. 9, a clock signal φ/2 shows a clock signal for forming one dot and 8φ shows a clock signal for dividing one dot to 16 equally divided blocks about the pixel center [a] in the present embodiment and has a frequency obtained by multiplying the clock signal φ/2 by 16. Further, the items (a), (b), (c), (d), (e), (f), (g), and (h) show an example of output timings of the S-TRG and E-TRG signals after the signal output from the image formation timing signal generation circuit 308 has been level converted, wherein:

(a) where the Video signal 3 is 0–ay;

(b) where the Video signal 3 is ay–by;

(c) where the Video signal 3 is by–cy;

(d) where the Video signal 3 is cy–dy;

(e) where the Video signal 3 is dy–ey;

(f) where the Video signal 3 is ey–fy;

(g) where the Video signal 3 is fy–gy; and (h) where the Video signal 3 is gy–hy.

Next, an image forming operation will be described referring mainly to FIG. 8.

The digital image data Video supplied from the image memory control block 103 is latched by the latch circuit 301 at a leading edge of the clock signal φ and the Video 1 is provided as an input to the average circuit 302. In the present embodiment, the provided Video 1 is alternately latched by latch circuits 401 and 402 at a leading edge of the clock signal φ and a Video 4 is supplied from the latch circuit 401 to an adder 403 and a Video 5 is supplied from the latch circuit 402 to the adder 403. A Video 6 output from the adder 403 is input to a divider 404, an output from the divider 404 becomes an output Video 2 from the average circuit 302 and is provided as an address to be input to the RAM 305. At this time, the multiplexer 303 selects an output from the average circuit 302 and the multiplexer 304 selects an output from the multiplexer 303. On receiving the above Video 2, the RAM 305 outputs a γ converted data and the γ converted output data is latched by the latch circuit 306 at a leading edge of the clock signal φ/2 (Video 3). The image formation timing signal generation circuit 308 fetches the Video 3 at a leading edge of the V-LATCH and generates the S-TRG and E-TRG signals at any one of the timings of (a), (b), (c), (d), (e), (f), (g) and (h) shown in FIG. 9 in accordance with a value of the Video 3 [FIG. 8 shows an example of (f)]. Further, the process for driving a laser driver (not shown) by the delay value calculation circuit 309 via the delay generation circuits 311 and 312 and flip-flop 313 is similar to the case in which one pixel is formed by a single digital input image signal.

<Another Example of an Arrangement of Image Formation Timing Control Block>

Figure 11:
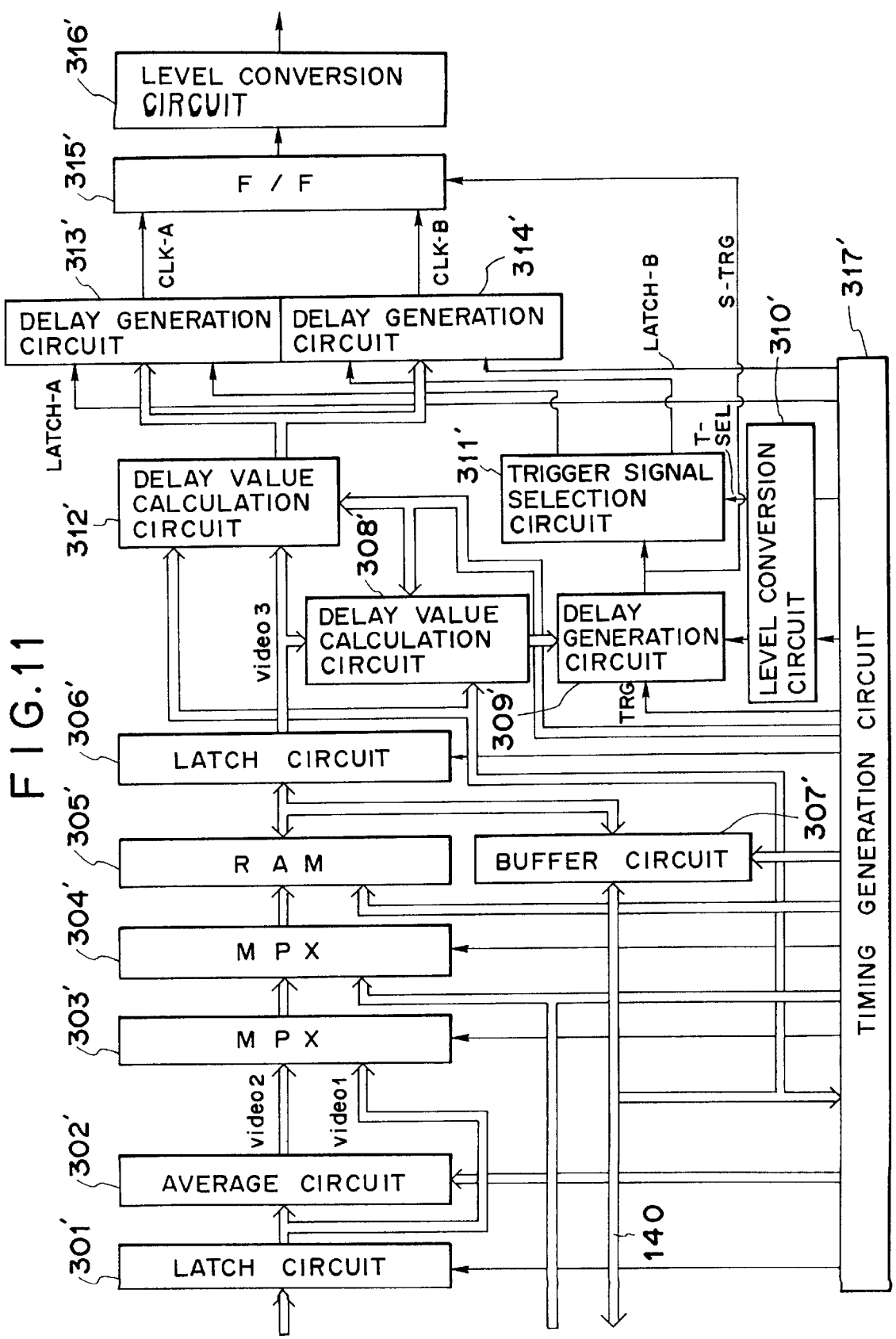
FIG. 11 is a diagram showing the schematic arrangement of a second embodiment of an image formation timing control block.

FIG. 11 is a diagram showing the arrangement of another example of the image formation timing control block 108 of the image formation apparatus 102.

In FIG. 11, components 301' to 307' have the same functions as those of the components 301 to 307 in the aforesaid arrangement example, wherein 301' designates a latch circuit for latching digital image data (Video) transmitted from the image memory control block 103 (an output from the latch circuit 301' is designated as Video 1); 302' designates an average circuit for averaging a plurality of digital input image signals when a mode in which a plurality of pixels of the digital input image signal correspond to one dot (an output from the average circuit 302' is designated as Video 2), the average circuit being arranged, for example, as shown in FIG. 4; 303' designates a multiplexer (MPX) for switching the selection of the Video 1 and the selection of the Video 2 depending on a selected mode; 305' designates a multiplexer (MPX) for switching an address information to be supplied to the RAM 305' depending upon, for example, a case in which the CPU 105 sets the γ conversion data shown in FIGS. 7 and 10 to the RAM 305' prior to the formation of an image and a case in which the γ conversion data is selected in accordance with a value of the Video 1 (or the Video 2) when the image is formed; 307' designates a buffer circuit for electrically connecting or disconnecting the data bus 140 of the CPU 105 to and from the I/O bus of the RAM 305'; and 306' designates a latch circuit for latching data output from the γ conversion RAM 305' when the image is formed (an output from the latch circuit 306' is designated as Video 3).

Also in FIG. 11, 308' designates a delay value calculation circuit for calculating a time delay value in accordance with a density to be reproduced until a start trigger S-TRG signal indicating the start of one dot formation interval is generated, based upon a value of the Video 3 received thereby; 309' designates a delay generation circuit which receives an output from the delay value calculation circuit 308', provides a time delay from the TRG signal in accordance with a predetermined density and generates an S-TRG signal in response to an output from the delay value calculation circuit; 310' designates a level conversion circuit for converting a TTL level signal to an ECL level signal; 311' designates a trigger signal selection circuit for receiving the S-TRG signal and selecting a delay generation circuit 313' or a delay generation circuit 314' to be supplied with a trigger signal; 312' designates a delay value calculation circuit for calculating a time delay value in correspondence with a density to be reproduced from the above S-TRG signal to a CLK-A or CLK-B signal indicating the end of an image formation; 313' and 314' designate the delay generation circuits for receiving an output from the delay value calculation circuit, providing a time delay in accordance with a predetermined density from the S-TRG signal and generating the CLK-A or CLK-B signal, respectively; 315' designates a flip-flop for generating a pixel signal having a pulse width in accordance with a predetermined density on receipt of the above S-TRG, CLK-A and CLK-B signals, and 316' designates a level conversion circuit for converting an ECL level signal to a TTL level signal.

Further, designated at 317' is a timing generation circuit for generating an operation timing of the image formation timing control block 108.

Next, the operation of the image formation timing control block 108 will be described below with reference to FIGS. 12 and 13 with respect to a mode in which one dot is formed in correspondence with one pixel of a digital input image signal and a mode in which one dot is formed in correspondence with a plurality of pixels of the digital input image signal.

First, the operation of the image formation timing control block 108 will be described when one dot is formed in correspondence with one pixel of the digital input image signal.

Figure 12:
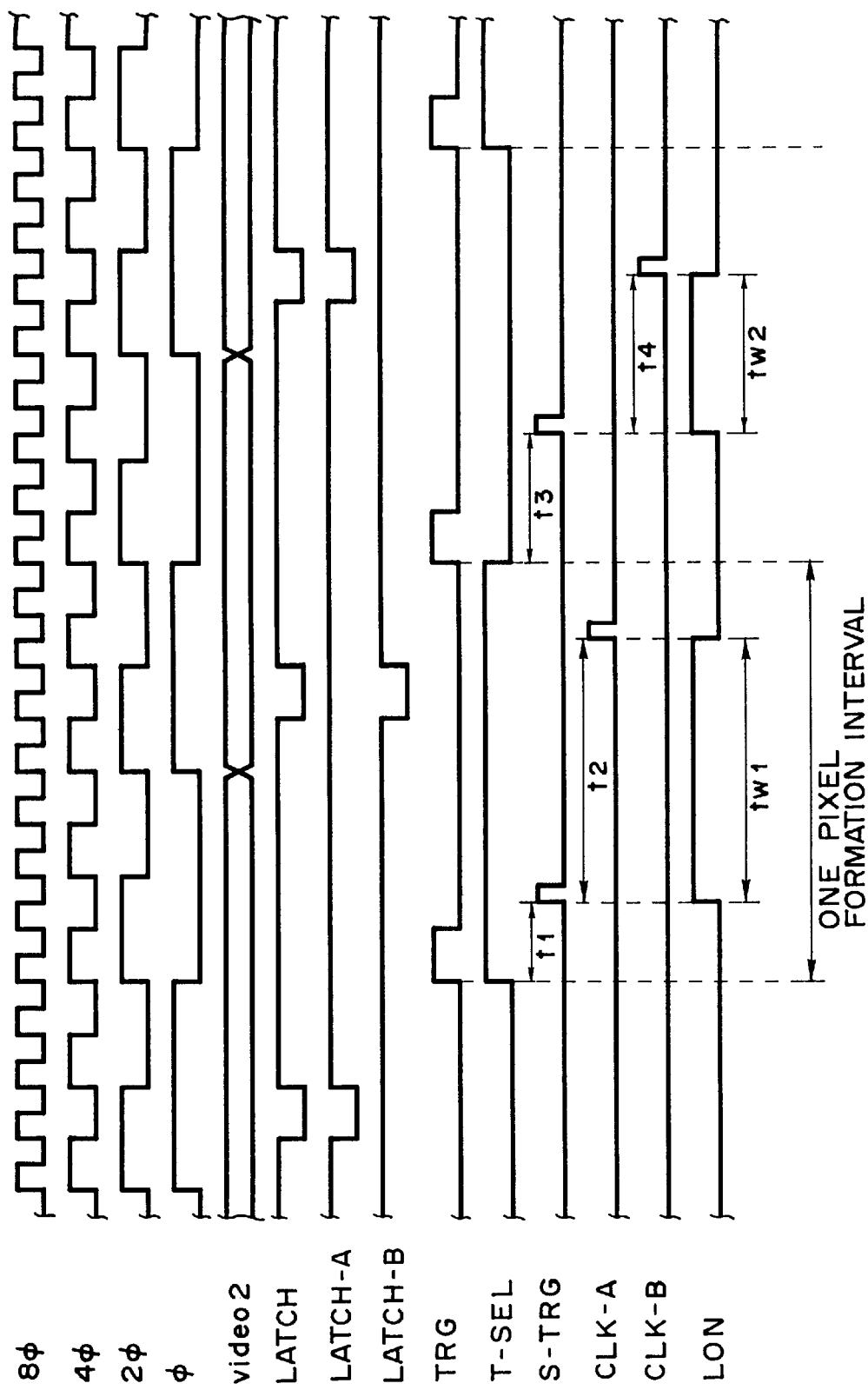
FIG. 12 is a diagram showing an example of the operation of the image formation timing control block shown in FIG. 11 in a mode in which a single digital input image signal corresponds to one dot.

FIG. 12 is an example of an operation timing chart showing an example of the image formation timing control block 108 in the mode in which one dot is formed in correspondence with a single digital input image signal.

Digital image data Video output from the image memory control block 103 is latched by the latch circuit 301' at a leading edge of the clock signal φ for forming one dot and Video 1 is urged as an address to be input to the RAM 305' (at this time, the multiplexer 303' selects an output from the latch circuit 301' and the multiplexer 304' selects an output from the multiplexer 303'). The RAM 305' outputs γ converted data on receipt of the Video 1 and the γ converted output data is latched by the latch circuit 306' at a leading edge of the clock signal φ (Video 3).

The delay value calculation circuit 308' calculates a delay time value corresponding to t1 (or t3) in FIG. 12 on receipt of the Video 3 and supplies same to the delay generation circuit 309'. The delay generation circuit 309' latches a signal output from the delay value calculation circuit 308' in response to a LATCH signal in FIG. 12 and thereafter generates an S-TRG signal on receipt of a TRG signal in synchronism with the clock signal φ for forming one dot, after the time delay t1 (or t3) in FIG. 12. The LATCH signal and the output from the delay generation circuit 309' may be TTL level signals.

Further, the delay value calculation circuit 312' calculates a delay time value corresponding to t2 (or t4) in FIG. 12 on receipt of the Video 3 and supplies same to the delay generation circuits 313' and 314'. The delay generation circuit 313' latches a signal (a value corresponding to t2) output from the delay value calculation circuit 312' at the timing of the LATCH-A signal shown in FIG. 12, and the delay generation circuit 314' latches a signal (a value corresponding to t4) output from the delay value calculation circuit 312' at the timing of the LATCH-B signal shown in FIG. 12. The LATCH-A signal, LATCH-B signal and the signal output from the delay value calculation circuit 312' may be TTL level signals.

More specifically, an S-TRG signal is alternately supplied to the delay generation circuits 313' and 314' every other dot from the TRG signal selection circuit 311' in response to a T-SEL signal in synchronism with the TRG signal, and the delay generation circuits 313' and 314' generates the CLK-A and CLK-B signals, respectively, after the predetermined delay time t1 and t3 have elapsed from the S-TRG signal. As shown in FIG. 12, the flip-flop 315' generates a signal LON' having a predetermined pulse width (tw1 or tw2) in accordance with a predetermined density on receipt of the S-TRG, CLK-A and CLK-B signals, and the signal LON' is subjected to an ECL to TTL level conversion by the level conversion circuit 316' (LON' signal) for controlling the density of an image to be formed while a laser driver (not shown) is driven.

Next, there will be described the operation of the image formation timing control block 108 in the mode in which one dot is formed in correspondence with a plurality of pixels of the digital input image signal.

Figure 13:
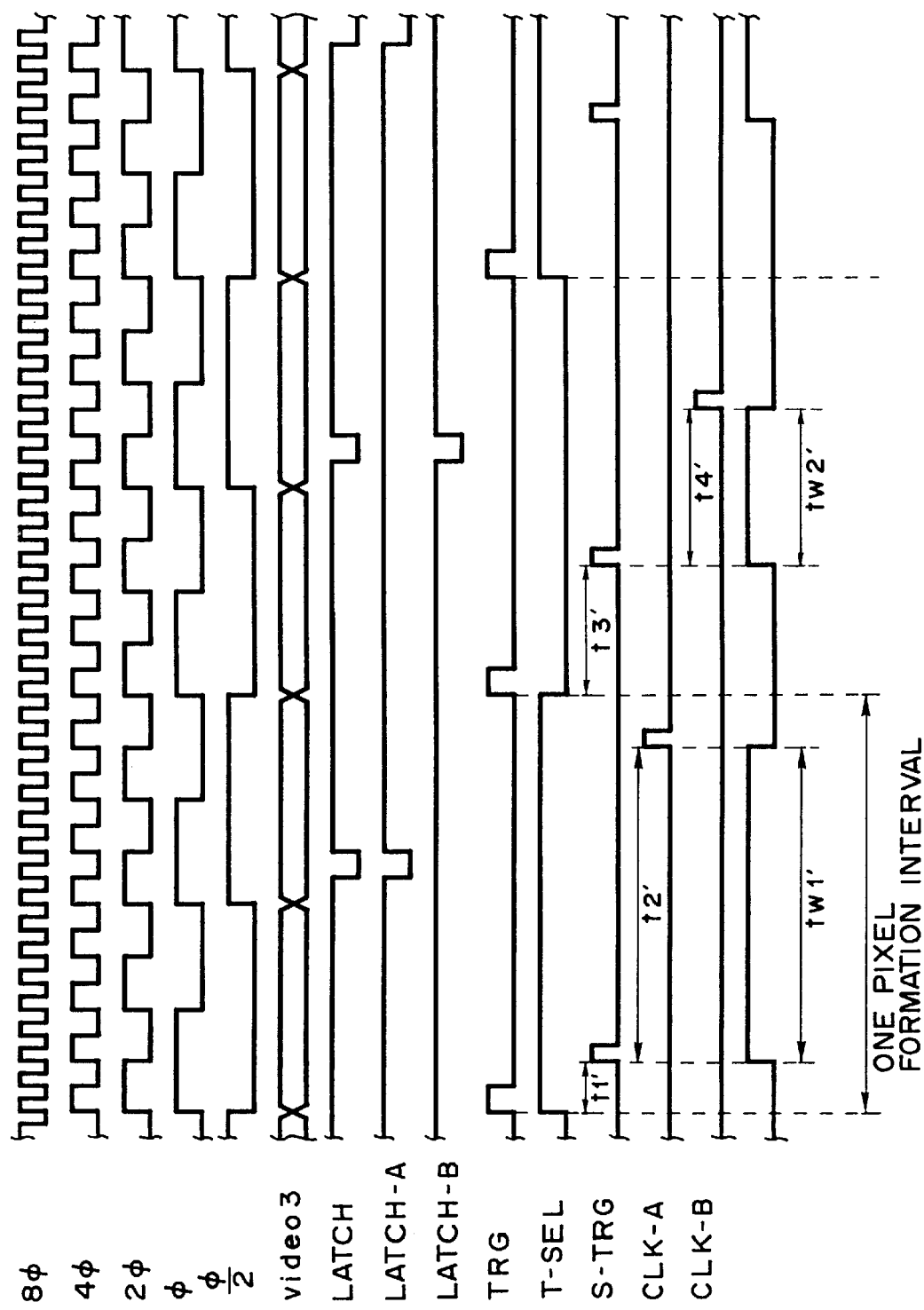
FIG. 13 is a diagram showing an example of the operation of the image formation timing control block shown in FIG. 11 in a mode in which a plurality of digital input image signals correspond to one dot.

FIG. 13 is an example of an operation timing chart showing an example of the operation of the image formation timing control block 108 in the mode in which one dot is formed in correspondence with a plurality of pixels of the digital input image signal.

Digital image data Video supplied from the image memory control block 103 is latched by the latch circuit 301' at a leading edge of the clock signal φ and the Video 1 is provided as an input to the average circuit 302'. When it is assumed that the average circuit is arranged, for example, as shown in FIG. 4 in the present embodiment, the provided Video 1 is alternately latched by the latch circuits 401 and 402 at a leading edge of the clock signal φ and a Video 4 is provided from the latch circuit 401 as an input to the adder 403 and a Video 5 is provided from the latch circuit 402 as an input to the adder 403. An output Video 6 from the adder is input to a divider and the Video 2 output from the average circuit is provided as an address to be input to the RAM 305'. At this time, the multiplexer 303' selects an output from the average circuit 302' and the multiplexer 304' selects an output from the multiplexer 303'. The RAM 305' outputs γ converted data on receipt of the Video 2 and the γ converted output data is latched by the latch circuit 306' at a leading edge of the clock signal φ (Video 3).

On receiving the Video 3, the delay value calculation circuit 308' calculates a delay time value corresponding to t1 in FIG. 13 and supplies same to the delay generation circuit 309'. The delay generation circuit 309' receives a TRG signal from the delay value calculation circuit 308' in response to the latch signal in FIG. 13 and generates an S-TRG signal after a time delay t1' in FIG. 13. The LATCH signal and the output from the delay generation circuit 309' may be TTL level signals.

Further, on receiving the Video 3, the delay value calculation circuit 312' calculates a delay time value corresponding to t2' in FIG. 13 and supplies same to the delay generation circuits 313' and 314'. The delay generation circuit 313' latches a signal output from the delay value calculation circuit 312' (a value corresponding to t2') at the timing of the LATCH-A signal in FIG. 13, and the delay generation circuit 314' latches a signal (not shown in the figure) output from the delay value calculation circuit 312' at the timing of the LATCH-B in FIG. 13. The LATCH-A signal, LATCH-B signal and the signal output from the delay value calculation circuit 312' may be TTL level signals.

More specifically, an S-TRG signal is alternately supplied to the delay generation circuits 313' and 314' every other dot by the TRG signal selection circuit 311' in response to a T-SEL signal in synchronism with the TRG signal, and the delay generation circuits 313' and 314' generate CLK-A and CLK-B signals, respectively, after a predetermined delay time has elapsed from the S-TRG signal. As shown in FIG. 13, the flip-flop 315' generates a signal LON' having a predetermined pulse width tw1' in accordance with a predetermined density on receipt of the S-TRG, CLK-A and CLK-B signals, and the signal LON' is subjected to an ECL to TTL level conversion by the level conversion circuit 316 (LON' signal) and then drives a laser driver (not shown) to thereby control the density of an image formed while the laser driver is driven.

As described above, according to the present invention, the following advantages can be obtained by providing the mode in which one dot is formed in correspondence with one pixel of a digital input image signal and the mode in which one dot is formed in correspondence with a plurality of pixels of the digital input image signal and by using the digital programmable delay generator for expressing an intermediate gradation:

(1) in the both modes, the intermediate gradation can be expressed by controlling an ON/OFF time of a laser beam without the need for offset and gain adjustments which are a characteristic of an analog circuit;

(2) in the mode in which one pixel is formed by one dot, the intermediate gradation can be expressed without significantly increasing an operating frequency of a circuit and without lowering the number of lines which can be reproduced (resolution);

(3) in the mode in which a plurality of pixels are formed by one dot, the gradation can be increased by averaging digital input image signals, although the number of lines able to be reproduced (resolution) is reduced; and (4) in the both modes, since the γ conversion processing can be changed, a density of the image formation apparatus can be corrected by the host computer.

Further, the following secondary advantages can be obtained:

(5) when one dot is formed, an arrangement is such that this one dot is roughly divided at first and then a divided block is further sub-divided, and thus a degree of a gradation can be easily increased; and (6) a desired density region can be more finely reproduced by the arrangement described in (5).

The present invention should not be limited to the aforesaid embodiments and various modifications are possible within the scope of the appended claims.

What is claimed is:

1. An image processing apparatus comprising:
an input means for inputting a digital input signal representing a gradation;
a first pulse signal generation means for generating a first pulse signal for each recording dot; and
a pulse width modulation (PWM) signal generating means for generating a PWM signal, each pulse of the PWM signal corresponding to one recording dot,
wherein said PWM signal generating means comprises:

a first programmable delay circuit for delaying the first pulse signal by a variable amount according to a value of the digital input signal and for generating a signal for determining a timing of a leading edge of the pulse of the PWM signal for each recording dot; and a second delay circuit for delaying the signal generated by said first delay circuit in accordance with the digital input signal and for generating a signal for determining a timing of a trailing edge of the pulse of the PWM signal for each recording dot.

2. An image processing apparatus according to claim 1, further comprising a first control means for controlling a timing at which the first pulse signal is generated by said first pulse signal generation means, based upon the digital input signal.

3. An image processing apparatus according to claim 1, further comprising:

a switch means for switching a first mode in which one recording dot corresponds to the digital input signal for one pixel and a second mode in which one recording dot corresponds to the digital input signal for a plurality of pixels.

4. An image processing apparatus according to claim 3, further comprising an averaging means for averaging the digital input signal for the plurality of pixels in the second mode.

5. An image processing apparatus according to claim 3, further comprising means for converting gradation characteristics of the digital input signal, wherein said converting means effects conversion of the different gradation characteristics in accordance with one of the first and second modes.

6. An image processing apparatus according to claim 1, further comprising means for converting gradation characteristics of the digital input signal.

7. An image processing apparatus according to claim 1, further comprising means for forming an image through an electrophotographic process in which light modulated by the PWM signal is used.

8. An image processing apparatus comprising:

input means for inputting a digital input signal representing a gradation; and pulse width modulation (PWM) signal generating means for generating a PWM signal, each pulse of the PWM signal corresponding to one recording dot, wherein said PWM signal generating means comprises:

a first programmable delay circuit having a variable delay amount according to a value of the digital input signal for determining a timing of a leading edge of the pulse of the PWM signal for each recording dot; and a second programmable delay circuit having a variable delay amount according to the value of the digital input signal for determining a width and/or a timing of a tailing edge of the pulse of the PWM signal for each recording dot.

9. An apparatus according to claim 8, further comprising first pulse signal generation means for generating a first pulse signal for each recording dot, wherein said first delay circuit delays the first pulse signal and generates a signal for determining a timing of a leading edge of the pulse of the PWM signal for each recording dot.

10. An apparatus according to claim 9, further comprising a first control means for controlling a timing at which the first pulse signal is generated by said first pulse signal generation means, based upon the digital input signal.

11. An apparatus according to claim 9, further comprising a second pulse signal generating means for generating a second pulse signal for each recording dot.

12. An apparatus according to claim 11, further comprising a second control means for controlling a timing at which the second pulse signal is generated by said second pulse signal generation means, based upon the digital input signal.

13. An apparatus according to claim 11, wherein said first delay circuit delays the first pulse signal and generates the signal for determining a timing of a leading edge of the pulse of the PWM signal for each recoding dot, and wherein said second delay circuit delays the second pulse signal in accordance with the digital input signal and for generating a signal for determining a timing of a trailing edge of the pulse of the PWM signal for each recording dot.

14. An apparatus according to claim 8, wherein said PWM signal generating means includes a flip flop circuit set and/or reset in response to the signal delayed by one of said first and second delay circuits.

15. An apparatus according to claim 8, further comprising a switch means for switching a first mode in which one recording dot corresponds to the digital input signal for one pixel and a second mode in which one recording dot corresponds to the digital input signal for a plurality of pixels.

16. An apparatus according to claim 15, further comprising an averaging means for averaging the digital input signal for the plurality of pixels in the second mode.

17. An apparatus according to claim 15, further comprising means for converting gradation characteristics of the digital input signal, wherein said converting means effects conversion of the different gradation characteristics in accordance with one of the first and second modes.

18. An apparatus according to claim 8, further comprising means for converting gradation characteristics of the digital input signal.

19. An apparatus according to claim 8, further comprising means for forming an image through an eletrographic process in which light modulated by the PWM signal is used.

* * * * *

UNITED STATES PATENT AND TRADEMARK OFFICE
CERTIFICATE OF CORRECTION

PATENT NO. : 6,034,787
DATED : March 7, 2000
INVENTOR(S) : TOMOHIRO HASHIMOTO ET AL.

It is certified that error appears in the above-identified patent and that said Letters Patent is hereby corrected as shown below:

ON THE COVER PAGE

Under Column [56], References Cited, after Primary Examiner, "Dov Popvici" should read --Dov Popovici--.

COLUMN 1

Line 31, "gradation, other" should read --gradation. Other--.

COLUMN 3

Line 55, "in later;" should read --in detail later;--.

COLUMN 5

Line 49, "provide" should read --provided--.

UNITED STATES PATENT AND TRADEMARK OFFICE
CERTIFICATE OF CORRECTION

PATENT NO.    : 6,034,787
DATED         : March 7, 2000
INVENTOR(S)   : TOMOHIRO HASHIMOTO ET AL.

It is certified that error appears in the above-identified patent and that said Letters Patent is hereby corrected as shown below:

COLUMN 8

Line 56, "same" should read --the same--.

COLUMN 10

Line 33, "a" should be deleted.

Signed and Sealed this

Twenty-fourth Day of April, 2001

Attest:

NICHOLAS P. GODICI

Attesting Officer

Acting Director of the United States Patent and Trademark Office